Figure 3:
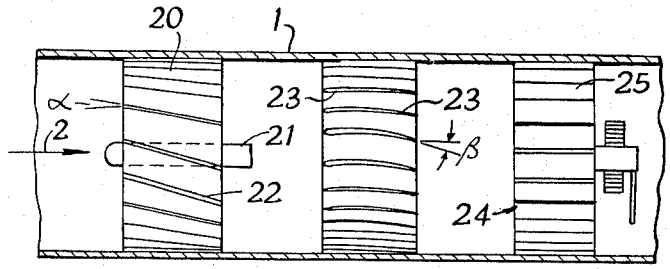

March 22, 1966  N. MOSS ETAL  3,241,367
APPARATUS FOR MEASURING THE MASS FLOW OF FLUIDS
Filed Jan. 28, 1963  6 Sheets-Sheet 1
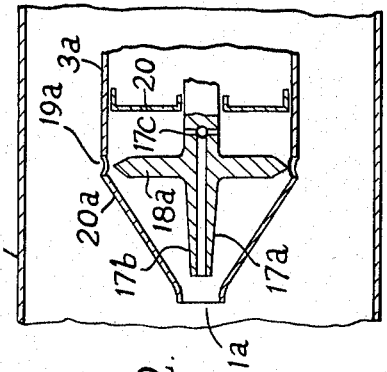
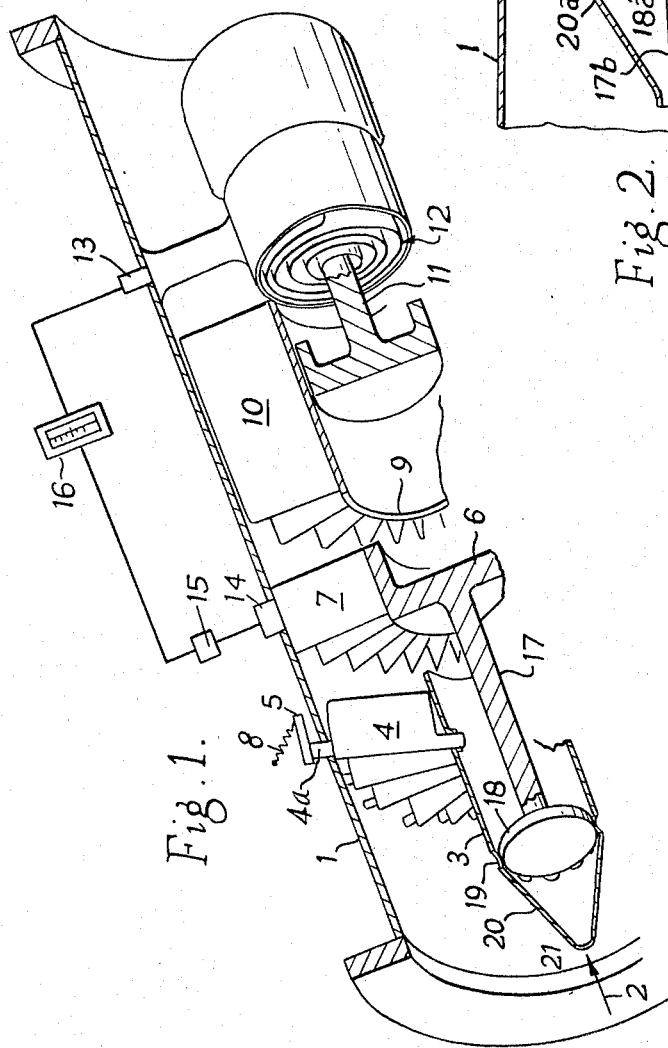

3,241,367
APPARATUS FOR MEASURING THE MASS FLOW OF FLUIDS
Norman Moss, Ilford, Thomas Alfred Oldfield, Allestree, Derby, and Peter Bruno Kahn and Kenneth John Coleman, Loughton, England, assignors to Plessey U.K. Limited, a British company
Filed Jan. 28, 1963, Ser. No. 255,717
Claims priority, application Great Britain, Feb. 2, 1962, 4,088/62
6 Claims. (Cl. 73—231)

This invention relates to the measurement of fluid flow and has for its object to provide a self-contained measuring instrument by means of which the momentary mass flow of a flow of fluid flowing in a duct can be ascertained. Another object is to provide an improved mass-flow meter with which a high degree of accuracy can be achieved within a relatively wide measuring range. A further object is to provide an improved mass-flow meter whose reliability is relatively little affected by fluctuations in the rate of flow. According to the present invention the mass flow measuring device comprises in combination a stationary variable-angle deflector means arranged in the duct and adapted to impart to the fluid a swirl about the axis of the duct, a means for measuring the rate of swirl thus produced, and torque responsive reactor means for measuring a torque reaction produced by this swirling movement of the fluid flowing through the duct. This torque is under any given conditions proportional to the product of the mass flow of the fluid passing through the duct and the circumferential speed due to the swirl, and since the circumferential speed is ascertained by the first-mentioned measuring device, the mass flow is represented by the quotient of the two measuring data obtained. The torque-measuring reactor may be constituted by the deflector means or by a separate reactor arranged downstream of the speed-measuring means and arranged to remove the swirl from the fluid leaving the said speed-measuring means.

Preferably the apparatus is designed to give a direct indication of the mass flow. This may be achieved either by computer means, for example by the co-operation of two scales arranged to move in opposite directions respectively in accordance with the logarithms of the measured speed and the measured torque, or the deflector means may be made adjustable automatic means being provided which so control the setting of the deflector blades as to maintain either the circumferential speed or the torque constant. In the former case the torque-measuring means, and in the second case, the speed measuring means, will then give a reading which is a singular function of the mass flow, thus permitting, by the use of suitable graduation, the mass flow to be read direct on a single scale.

Since the tangential flow component affects both the reactor torque and the turbine speed proportionally to each other, and since on the other hand only the quotient of reactor torque and turbine speed is utilised for determining the mass-flow rate, means may be provided for automatically varying the angles of the deflector blades which determine the rate of swirl in such manner as to keep the turbine speed within convenient limits at high flow speeds without letting it fall so low as to be unduly affected by friction when the flow rate is low. This may be achieved by pivotally mounting the guide vanes with the centre of dynamic pressure so arranged as to urge the blades towards a more axially disposed position as the flow increases, and providing spring means which urge the blades in the opposite direction.

When the deflector means are fixed, the rate of swirl produced by the deflector means is proportional to the linear velocity of the undisturbed fluid reaching the deflector means. Therefore, according to a feature of the invention, if this fluid is free from swirl, the measurement of the rate of swirl produced by the deflector means may be replaced by a measurement of the linear velocity of the undisturbed fluid, and this may be achieved by placing the rotor into the incoming undisturbed flow instead of the swirling flow produced by the deflector blades, the rotor blades being set at an angle to the axial direction of flow.

According to another modification a rotor having blades set at an angle to the axial direction of flow may alternatively be used in the swirling flow produced by the deflector blades with the result that the rotor will be stationary when the swirl velocity is equal to the product of the axial velocity of the swirling flow multiplied by the tangent of the angle at which the rotor blades are set. This arrangement is of advantage when employing deflector blades the angle of incidence of which is arranged to be reduced by the reaction forces due to the flow of liquid in the duct, so that at high flow velocities both the flow resistance of the device and the rotor speed are kept within moderate limits. With the device first proposed hereinabove the difficulty was liable to arise in this case that at very high speeds the angles of incidence became very low, not only reaction forces became small in relation to the energy of the flow but at the same time its radius of action about the pivot axis of the blades decreased towards zero, thus involving an element of instability. With a rotor having its blades set at an angle to the axial direction, this difficulty is substantially overcome because the angle of incidence of the deflector blades for zero speed of the rotor has a value appreciably different from zero.

An alternative possibility of obtaining increased effective moment (torque) about the pivot axis of each deflector blade consists in arranging the pivot axis of each blade outside the plane of the blade and/or using curved blades which permit the pivot axis to be so arranged in the blade that the axis of the flow-resistance force is laterally displaced from the pivot axis at zero angle of incidence at the exit point of the blades.

The axial thrusts of the speed-measuring rotor and of the torque measuring reactor may be neutralised, the former by providing a restriction in the passage of the incoming flow and causing the reduced static pressure in this restriction to act on an area on the upstream face of the rotor employed for measuring the rate of swirl, and the latter by admitting to a surface at the downstream end of the torque-measuring reactor an increased pressure produced beyond the downstream end of the rotor by a diffuser portion of the duct.

Radial bearing forces on the swirl measuring rotor and on the torque measuring reactor may be minimised by forming the rotor and reactor bodies with internal cavities constituting floating chambers which increase the displacement volume of each of these bodies to such an extent that the weight of the displaced liquid is approximately equal to the total weight of the body.

The torque-measuring rotor may advantageously be constructed as an electro-magnetic torque motor and the magnitude of the magnetic flux required to balance the torque utilised as a measure for the torque.

Further optional features of the invention relate to the arrangement of inlet guide vanes upstream of the swirl-measuring rotor and to means for automatically so altering the setting of these guide vanes as to limit, within a desired measuring range variation of the swirl producted by them to a small fraction of the alteration of the rate of flow.

Figure 4:
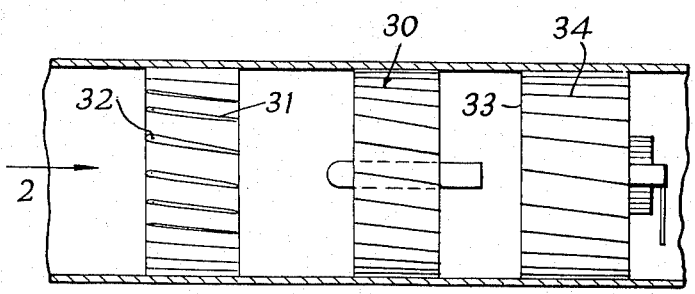
Figure 5:
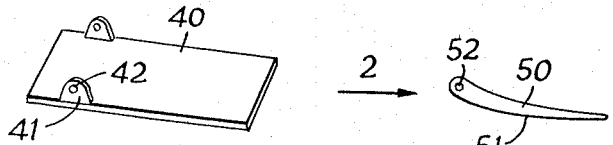
Figure 6:
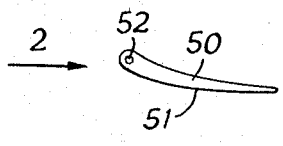
Figure 7:
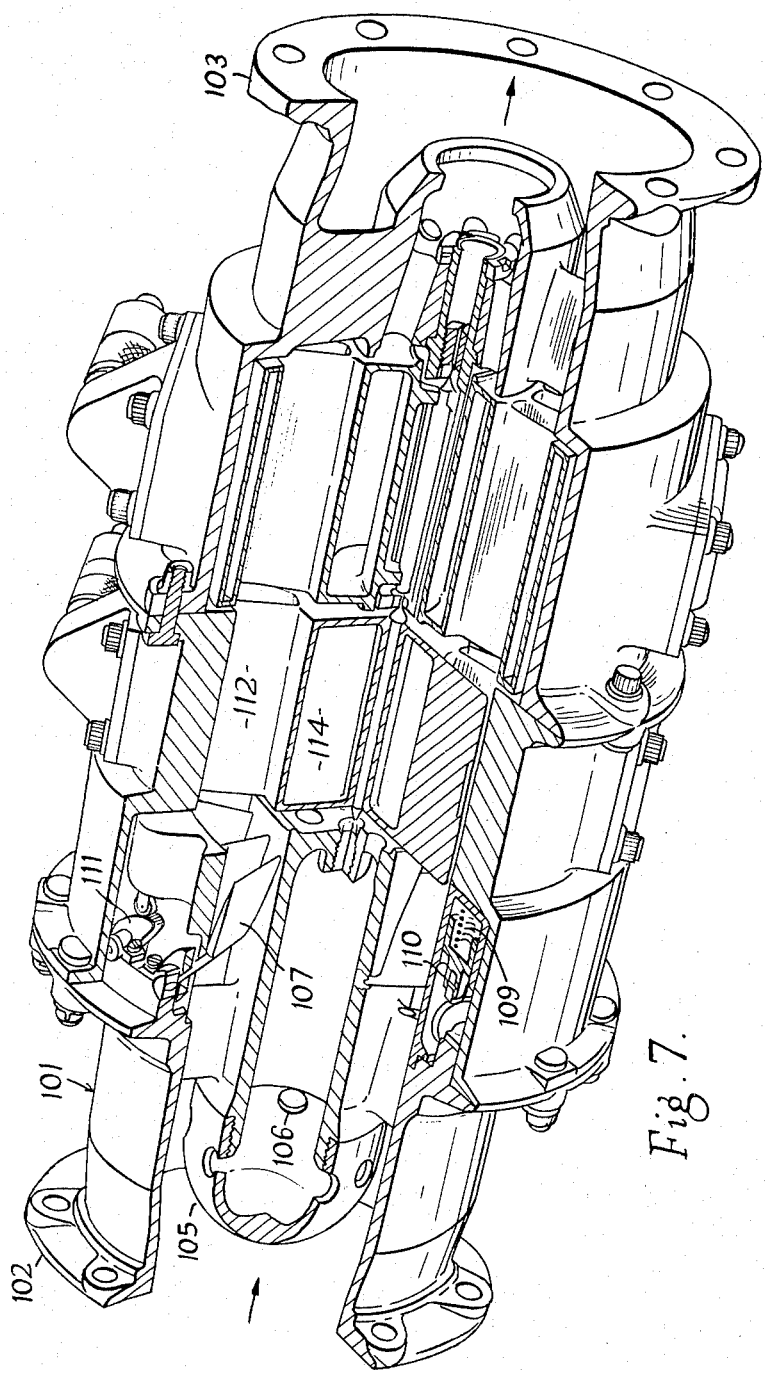
Figure 8:
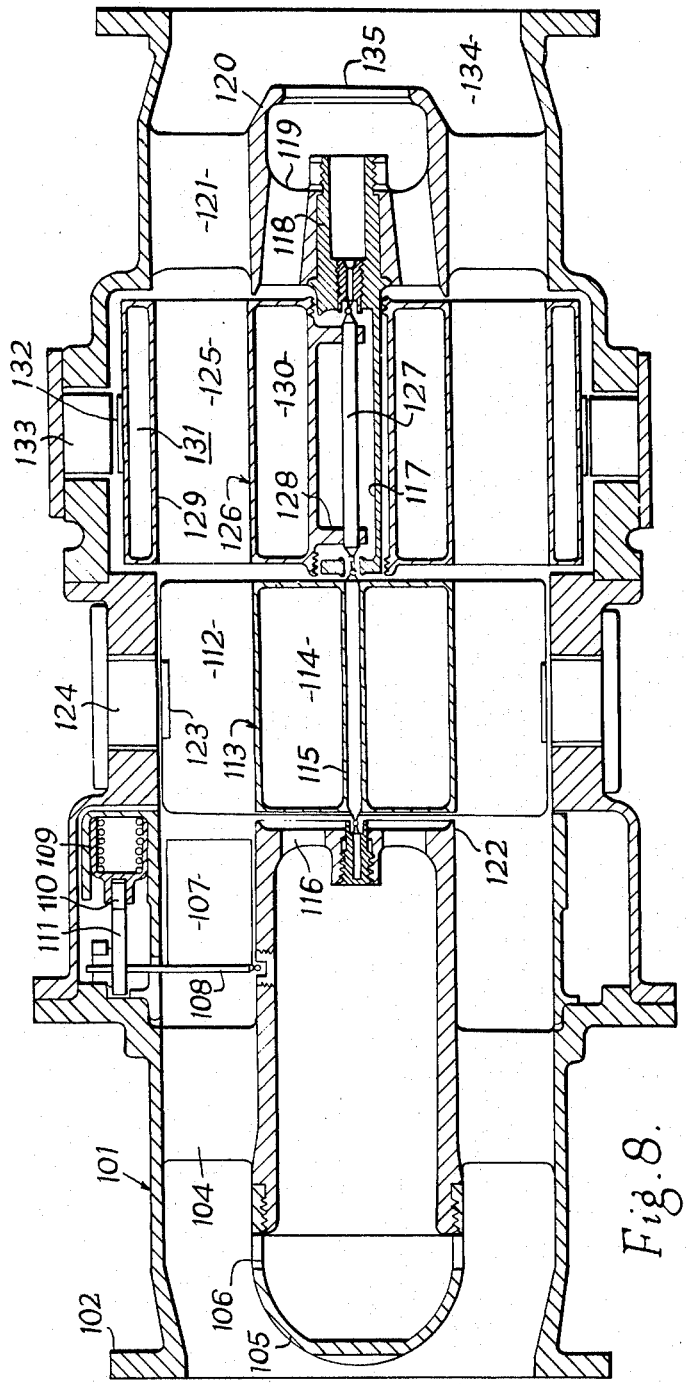
Figure 9:
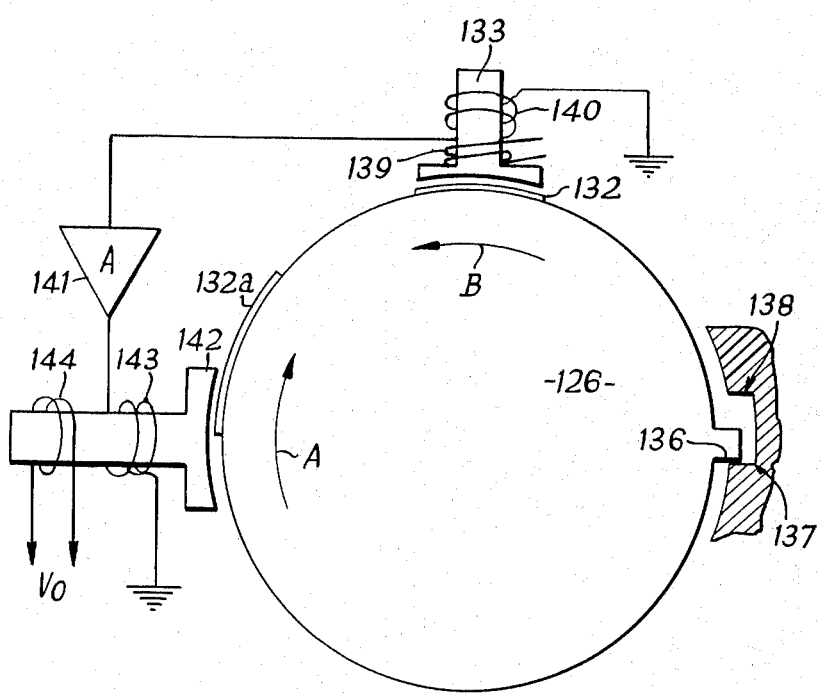
Figure 10:
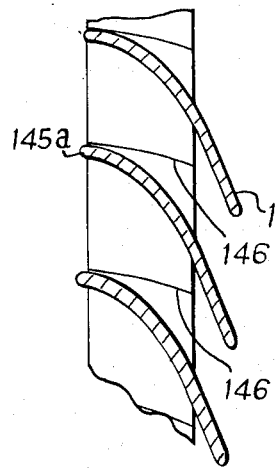
Figure 11:
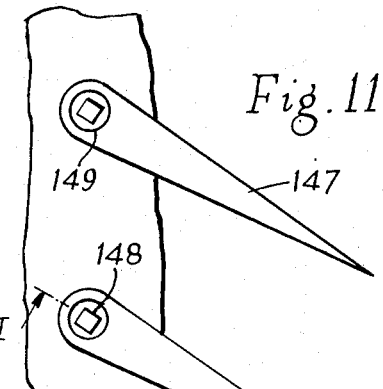
Figure 12:
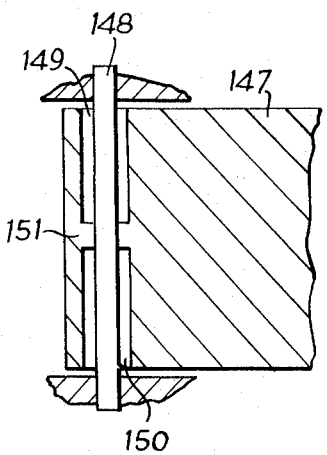

In the accompanying somewhat diagrammatic drawing,
FIGURE 1 is a perspective view with some parts broken away, of a mass-flow meter according to one form of the present invention, FIGURE 2 is a fragmentary sectional elevation showing a modification of a detail thereof, FIGURE 3 shows a duct with a speed-measuring rotor upstream of the fixed deflector blades, FIGURE 4 shows an arrangement in which a rotor having inclined blades is interposed between a set of adjustable deflector blades and a torque-measuring stator, FIGURE 5 is a perspective view showing an adjustable blade in which the pivot axis is spaced from the plane of the blade, FIGURE 6 is a cross-section of a curved deflector blade showing that at zero angle of incidence at the outlet the effective reaction force still has a finite lever arm relative to a pivot axis arranged within the profile of the blade, FIGURE 7 is a perspective view, partly in section of another embodiment, FIGURE 8 is a sectional elevation of it, FIGURE 9 is a diagrammatic end view illustrating the torque measuring means, FIGURES 10 and 11 respectively illustrate two modified arrangements of the self-adjusting inlet guide vanes, FIGURE 10 being a fragmentary end view showing some of a set of flexible blades together with one of their support-channel sets, while FIGURE 11 is an end view on two swivel blades forming part of a set of guide vanes, and FIGURE 12 shows one such guide vane with its supporting rod in section on line 12—12 of FIGURE 11.

Referring now first to FIGURE 1, 1 is a duct through which the flow of a fluid, which may be liquid or gaseous, is conducted in the direction of the arrow 2. Adjacent to the inlet of the duct a tubular shroud 3 confines the flow to an annular passage, in which guide or deflector vanes 4 are arranged, the angle of which is adjustable by mechanism diagrammatically indicated at 5, and which at any given setting will impart to the flow a swirl of which the circumferential velocity is proportional to the speed of the flow along the duct 1. A turbine wheel 6 having axially disposed blades 7 in the annular duct is arranged downstream of the deflector blades 4 so that it will rotate at a speed proportional to the above-described rate of swirl. Arranged in the duct 1 downstream of the turbine blades 7 is a stator 9 carrying reactor blades 10 which are so shaped as to re-convert the swirling flow leaving the turbine blades 7 into a purely axial flow similar to that entering at 2. In order to allow the resultant reactor torque to be measured, the reactor 9 is mounted on shaft 11 which is rotatable and is subject to the action of a temperature-compensated spring 12, the rotation of the shaft 11 under the reaction torque being measured by a torque meter 13. The turbine speed is measured by a suitable device imposing minimum resistance to its rotation. In the illustrated embodiment this device is constituted by a pulse counter 14 the output of which feeds a pulse-rate meter 15. The mass flow is constituted by the quotient of the torque indicated by the torque meter 13 divided by the speed indicated by pulse-rate meter 15, and while it could be ascertained by calculation from simultaneous readings of the two instruments, suitable computer means are preferably provided to give a direct indication. In the illustrated embodiment the computer means comprise an indicating instrument 16 fed by the respective outputs of the torque meter 13 and pulse rate meter 15 and having two dials respectively moving in opposite directions in accordance with the logarithms of the two outputs, so that a marker on one dial will directly show on a logarithmic graduation of the other dial the rate of mass flow through the duct 1.

In order to ensure that the speed of the turbine 6 is accurately proportional to the rate of swirl of the flow leaving the blades 4 and thus to the circumferential speed of the fluid entering the reactor blade 10, resistance to rotation of the turbine wheel 6 must be limited to a minimum. With this object in view the illustrated embodiment includes a hydrodynamic balancing device which makes the use of a thrust bearing unnecessary. The shaft 17 carrying the turbine wheel 6 is equipped with a piston 18 which is axially movable in the tunnel 3. A peripheral land of this piston co-operates with ports 19 in the tubular shroud 3 so as to blank a greater or smaller part of these ports according to the axial position of the turbine wheel. The shroud 3 is continued beyond the piston 18 by a trunconical fairing 20 having at its narrower end an inlet aperture 21 facing the flow 2. Since the cross-section available for the flow 2 is, due to the insertion of the tunnel 3, smaller at the ports 19 that at the inlet aperture 21, the flow of fluid through the duct 1 causes the pressure at apertures 19 to be lower than at inlet aperture 21, and the pressure inside the fairing 20, which acts on the outer face of piston 18, will vary according to the area of ports 19 which is exposed by the piston 18, in relation to the area of inlet aperture 21, from a maximum equal to the pressure at aperture 21 to a minimum which is equal to the pressure in apertures 19. The pressures inside the shroud 3 will also act on the adjacent side of the turbine wheel and is thus balanced through the shaft 17, the relevant pressure being therefore that at the exit from the turbine wheel, which acts on the turbine wheel between the latter and the reactor. In the illustrated embodiment this pressure is arranged to be higher than the pressure at apertures 19, the hub of the turbine wheel 6 being tapered so as to cause the fluid to expand radially during its flow through the turbine wheel 7. As a result the piston 18 will assume a position in which the ports 19 are partially covered, establishing at the outer side of piston 18 a pressure intermediate between the pressures at port 19 and aperture 21 so as to achieve axial pressure balance on the shaft 17.

In order to reduce the maximum values of the turbine speed and reactor torque, the pivot axes 4a of the blades 4 are so arranged that the flow tends to turn the blades towards an axial position, while spring means 8 urge the blades towards a more tangential position, so that the speed increase of the turbine wheel 6 and the torque increase on the reactor 10 is greater for a given increase in the mass flow at low speeds of flow than at high speeds of flow.

Details of the embodiment described may be modified within the scope of the invention. Thus the piston 18, having a cylindrical outer surface which acts as a land covering part of the ports 19, may be replaced by a sharp-edged piston 18a as shown in FIGURE 2, and the shaft 17a may in this case be formed with an axial passage 17b facing inlet aperture 21a of the fairing 20a and communicating through cross bores 17c with the interior of the shroud 3a between the piston 18a and a partition 20 fixed in the tunnel 3a. In this case the pressures at the two sides of the piston 18a will vary inversely between the pressure at inlet 21a and the pressure at ports 19a as the shaft 17a with the piston 18a moves towards or away from the inlet 21a so that the resulting pressure difference will oppose the displacing movement, thus centralising the turbine wheel without relying on a pressure rise in the flow through the turbine wheel.

In FIGURE 3, in which the direction of the flow is again indicated at 2, the duct 1 contains, in the direction of flow, a rotor 20 freely rotatable about a shaft 21 and having blades 22 set at an angle α to the axis of the duct, the rotor being followed by a set of fixed deflectors 23 which are shown as curved blades having an axial inlet and an outlet inclined to the axis by a fixed angle β, and a torque-measuring stator 24 having axially extending blades 25, arranged downstream of the deflector blades 23.

In the embodiment of FIGURE 4 a rotor 30 similar to the rotor 20 of FIGURE 3 is arranged in the duct 1 between a set of deflector blades 31 which are freely movable about their pivots 32 against spring biasing means, not shown, which biasing means tend to increase the angles of incidence of the blades, while the reaction force due to the diversion of the flow 2 tends to reduce the angles of incidence. The spring means are so arranged that, even at the maximum flow intended to be measured, the angle of incidence of the blades 31 is still greater than that of the blades of the rotor 30, thus ensuring that the speed of the rotor 30 remains always positive. Downstream of the rotor 30 a stator 33 is provided having blades 34 whose angle of incidence (at least at the outlet) is the same as that of the blades of the rotor 30, so that the measured torque is zero under the same conditions under which the speed of the rotor 30 is zero.

FIGURE 5 shows a blade 40 which at its innermost and outermost edges is provided with ears 41 which have pivot bearing 42 outside the plane of the blade 40.

FIGURE 6 shows an alternative construction in which the deflector blades 50 are of curved aerofoil profile so that when the blade is exposed to a flow in the direction of the arrow 2 and its angle of incidence its outlet is zero, so that the outgoing flow is parallel to the direction of the flow 2, the greater part of its effective surface 51 is arranged to one side of its pivot 52, the pivot having, as shown, provided inside the profile of the blade near the leading end thereof. The blade constructions illustrated in FIGURE 5 and in FIGURE 6 may be used in the flow-meter as illustrated in FIGURES 1 and 2 with a view to avoiding the need of utilising stator and rotor blades of the kind shown, set at an angle to the axial direction in FIGURE 4.

The mass-flow meter shown in FIGURES 7 to 9 comprises a tubular housing 101 built in several sections and having at the upstream and downstream end respectively attachment flanges 102 and 103 by means of which it can be joined to other sections of a duct for a liquid to be metered, for example of the fuel line of an aeroplane engine coaxially supported inside the housing 101 adjacent to the upstream end by four radial struts 104 is a static-pressure-control inlet fairing 105 which, at a point near the inlet end, constricts the cross-section of the flow duct and is provided, at or near the point of greatest constriction, with radial perforations 106 for a reason which will become apparent further below. A set of inlet guide vanes 107 are each pivotally mounted in the annular duct surrounding the inlet fairing 105 on a shaft 108, and a spring 109 acting through a roller 110 on cam member 111 fixed on each shaft 108 urges the guide vanes 107 to form a maximum angle with the direction of axial flow. Since the shafts 108 are arranged near the upstream end of each blade, the reaction forces due to the deflecting action of the blades upon the flow tend to move the blades towards a more axial position, in which the blades produce less swirl, so that, by suitably choosing the rate of the springs 109 and the shape of the cams 111, the angular setting which the blades assume may be arranged to follow a desired function of the flow velocity. The rate of swirl produced by the guide vanes is measured by a set of straight, axially disposed speed paddles 112 which are formed integral with a hollow rotor body 113. The cavity 114 of the rotor 113 is made of such size that the complete rotor body shows apparent weightlessness when submerged in the fuel of which the mass flow is to be measured. The rotor 113 is mounted on a spindle 115 the pointed ends of which are supported in sapphire bearings; the bearing for the upstream end is mounted by radial arms 116 in the downstream end of the fairing body 105, while that for the downstream end is supported in a trough-like bracket 117 which projects from a bearing support body 118 carried by fins 119 in an outlet fairing 120 which itself is held by radial fin arms 121 in the downstream end of the duct housing 101, the inlet fairing 105 has at its trailing end an axially projecting annular lip 122 which closely approaches the upstream end of the hollow rotor body 113 so that the upstream face of the rotor body is exposed to the low static pressure which through the perforations 106 is admitted to the interior of the fairing body 105, the amount of the restriction of the flow at perforations 106 being so chosen that the sum of the static pressure acting on the upstream face of the body 113 and of the dynamic pressure acting on the leading edges of the blades 112 will be balanced by the opposite forces acting upon the downstream end of the body 113 and blades 112. While the body 113 and blades 112 are preferably formed from non-magnetic material, each paddle blade 112 has an insert 123 of soft iron in its outer edge, and the housing 101 carries a suitable number of electromagnetic pulse-pickup elements 124 which produce an electric pulse each time they are passed by one of the inserts 123. The speed of rotation of the rotor 112, 113 can therefore be measured by a count of the pulses thus produced per unit of time. Arranged downstream of the speed-measuring rotor 113 and coaxially therewith is a torque-measuring member having likewise axially arranged rectilinear blades or torque paddles, shown at 125 which are mounted on an annular hollow body 126 arranged coaxially with the body 113. To permit a limited pivotal movement of the body 126 about its axis, it is secured on a pointed-end spindle 127, by a pair of brackets or lugs 128 which project from the inner wall of the body 126, and the points of the spindle 126 rest in sapphire bearings of which one is held in the trough-like bracket 117, adjacent to one of the bearings for spindle 115 of the rotor 113, while the other sapphire bearing is held in the bearing support body 118 proper. The number of torque-measuring blades 125 may, for example, be sixteen, the rotor 113 also being provided with sixteen blades 112. For greater rigidity the outer ends of the torque paddles 125 may be secured to, or integral with, a hollow shroud ring 129. The total volume of the cavities 130 and 131 respectively formed in the body 126 and in the shroud ring 129 is, similarly as in the case of the rotor 113, made such that the complete torque-measuring member shows apparent weightlessness when submerged in the fuel of which a mass-flow rate is to be measured. The torque-measuring member 126 is, similarly to the rotor 113, preferably made of non-magnetic material, such as light metal casting, and it carries on the outer side of the shroud 129 a number of soft-iron segments 132. These segments form part of a torque motor which will be described further below, and which serves to limit the angular displacement which the member 126 will suffer in response to any particular torque, and which also includes alternating-current pick off members 133 mounted in the outer housing 101. In order to substantially balance the axial forces to which the element 126 with its blades 125 is subjected under the action of the fuel flow, the outlet fairing 120 is tapered inwardly at the downstream end to form a diffuser portion 134 which produces a rise in pressure at its downstream end, and the thus increased pressure is admitted by an end opening 135 to the interior of the outlet fairing 120 and thus to the downstream-end face of the body 126. This face is substantially isolated from the surrounding lower static pressure due to the fact that the upstream end of the fairing 120 is formed with a cap closely approaching the downstream face of the body 126.

The construction of the torque motor and pick off means associated with the torque metering element 126 will be more readily understood from the following description with reference to FIGURE 9, which is a diagrammatic end view of the relevant elements of the torque motor. The arrow A in FIGURE 9 shows the direction of swirl produced by the inlet guide vanes in the flow to be measured and thus the direction of the torque which the flow will exert upon the torque-measuring member 126. The member 126 is formed with a dog 136 which is movable between two stop surfaces 137, 138 the former of which limits rotation of the body 126 in the direction of the swirl while the latter limits the return movement under the action of the motor arrangement to be described. The drawing shows the body 126 in the maximum flow position, in which the torque-measuring armature segment 132 fully faces the pickup member 133, thus providing for the latter a path of minimum magnetic reluctance. A primary winding 139 fed with a constant A.C. voltage will therefore produce maximum current in the secondary winding 140. This output, amplified in a silicon transistor unit 141, is used in a winding 143 to energise a magnetic pole member 142 which co-operates with a second soft iron armature member 132a arranged asymmetrically to the pole 142, so as to produce in the member 126 a feedback torque in the direction of arrow B, that is to say in opposition to the torque A produced by the swirling flow. When in response to this torque the member 126 begins to turn in the direction of the arrow B, the resulting displacement of the armature 132 relative to the pickup member 133 reduces in the coupling between windings 139 and 140 and thus the energisation of the torque motor 142, 132a until a state of balance is achieved, whereupon the magnetic flux through pole 142 constitutes a measure of the torque applied by the flow to the flow-measuring element 126. This flux, being an alternative flux, will produce a voltage proportional to the torque in a secondary winding 144 of the pole 142, and this voltage in winding 144 forms the output of the torque-measuring unit.

Utilisation of the two outputs respectively representing the swirl and torque to produce an indication proportional to the mass flow may be effected in any desired manner. Thus an electronic computer may be employed for the purpose. While an analogue computer, electronic or otherwise, may be used to ascertain the mass flow rate in any one fuel line, the use of a digital computer may be advantageous, more particulary when the fuel flow for each of a number of engines in an aircraft is to be ascertained individually and at the same time the total fuel consumption is to be integrated in order to ascertain the total quantity of fuel still available. In this case a number of mass-flow meter units of the kind hereinabove described may be arranged to feed a single digital computer on a time-sharing basis, thus permitting the computer to process the information so as to make all the required data available in a practically continuous manner.

Various details of the apparatus described with reference to FIGURES 7 to 9 may be varied without exceeding the scope of the invention. Thus the described cam spring-and-mechanism for automatically varying the setting of the inlet guide vanes may be replaced by the use of flexible guide vanes in a manner which will be explained below with reference to FIGURE 10, or of solid guide vanes mounted on twist bars in a manner which will be described with reference to FIGURES 11 and 12.

The arrangement illustrated in FIGURE 10 provides inlet guide vanes having a curvature which decreases with increasing flow velocity. For this purpose guide vane elements 145 are made from thin, springy materials and are secured in the annular passage of the housing 101 at their leading ends 145a, so that in the unstressed state they assume the illustrated shape of maximum curvature. Increasing flow velocity will produce an increased pressure on the concave side of each blade tending to reduce its curvature so as to progressively decrease the rate of swirl produced in relation to the rate of flow. Since, however, the bending moment produced by the hydrodynamic forces will be greatest near the fixed leading end 145a, there would be a tendency of the blade to assume an S formation with the leading portion of the blade still curved concavely and the trailing end convexly. To counteract this, support members 146 of small radial length may, according to a feature of the invention, be provided in the vicinity of the inner and outer walls of the tubular flow passage, which are so shaped that they will support a progressively increasing length of each blade as the blade is deformed, thus causing the maximum bending moment to move gradually from the attached upstream end 145a towards the downstream end of the blade. In an alternative construction each vane 147 is supported near its upstream end on a twist rod 148 of which the two ends are respectively secured against rotation in the housing 101 and in the fairing member 105, and which extends through two aligned bores 149, 150 in the thicker upstream end of each blade, which are separated from each other by a partition 151 integral with the blade 147, the centre of the twist rod 148 being keyed in this partition.

What we claim is:

1. A mass flow-meter for fluid flowing in a duct, which comprises in combination a stationary deflector means including variable-angle deflector vanes arranged in the duct and adapted to impart to the fluid a swirl about the axis of the duct, a first measuring means including a flow-responsive rotor and having an output measuring the rate of swirl produced by said stationary deflector means, a second measuring means having an output measuring a torque reaction produced by the swirling movement of the fluid flowing through the duct, said second measuring means including torque-responsive reactor means, fluid-flow-responsive means operative to respectively so decrease and increase automatically the angles of said deflector vanes to the longitudinal direction of the duct in response to increases and decreases in the rate of flow of fluid through the duct as to keep the speed of said rotor within convenient limits at high flow rates without letting it fall so low as to be unduly affected by friction when the rate of flow is low, and computer means fed with the output of said first and second measuring means and operative to determine the mass flow as the quotient of the values respectively represented by said outputs.

2. A mass-flow meter as claimed in claim 1, wherein the computer means include two co-operating members arranged to move in opposite directions respectively in accordance with the logarithms of the measured speed and the measured torque, at least one of said members having a logarithmic scale co-operating with an indicator mark of the other.

3. A mass-flow meter as claimed in claim 1, wherein the deflector vanes are mounted with the centre of dynamic pressure so arranged as to urge the vanes towards a more axially disposed position as the flow increases, spring means being provided which urge the vanes in the opposite direction.

4. A mass-flow meter as claimed in claim 1, wherein the first measuring devices includes a freely rotatable rotor actuated by the swirl, and wherein the angle of incidence of the deflector vanes is arranged to be reduced by the reaction forces due to the flow of liquid in the duct, so that at high flow velocities both the flow resistance of the device and the speed of said rotor are kept within moderate limits.

5. A mass-flow meter as claimed in claim 1, wherein said first measuring means includes a swirl-measuring rotor and bearings supporting said rotor, and said second measuring means includes a torque-measuring reactor and bearing supporting said reactor radial forces on the bearings of the swirl measuring rotor and of the torque measuring reactor being minimised by forming the rotor and reactor with internal cavities constituting floating chambers which increase the displacement volume of said rotor and said reactor to such an extent that the weight of the displaced liquid is approximately equal to the total weight of the rotor and reactor respectively.

6. A mass-flow meter as claimed in claim 1, wherein the torque-measuring reaction means includes a reactor constructed as an electro-magnetic torque motor, said second measuring means includes means for measuring the magnitude of the magnetic flux required to balance the torque produced by the reactor.

References Cited by the Examiner

UNITED STATES PATENTS

| | | | |
|---|---|---|---|
| 2,907,208 | 10/1959 | Taylor | 73—194 |
| 2,975,635 | 3/1961 | Kindler et al. | 73—194 |
| 3,060,740 | 10/1962 | Granberg | 73—231 X |
| 3,060,736 | 10/1962 | Maze | 73—194 |
| 3,063,295 | 11/1962 | Dowdell | 73—194 |
| 3,164,017 | 1/1965 | Karlby et al. | 73—231 X |

FOREIGN PATENTS

| | | |
|---|---|---|
| 594,282 | 3/1960 | Canada. |
| 1,296,971 | 5/1962 | France. |
| 209,685 | 5/1907 | Germany. |
| 728,132 | 11/1942 | Germany. |
| 814,405 | 6/1959 | Great Britain. |

RICHARD C. QUEISSER, *Primary Examiner.*

DAVID SCHONBERG, *Examiner.*

E. D. GILHOOLY, *Assistant Examiner.*